United States Patent
Hutchins

(10) Patent No.: US 7,436,609 B2
(45) Date of Patent: Oct. 14, 2008

(54) APPARATUS METHOD AND SYSTEM FOR CONCURRENT GAIN CONTROL IN A MAGNETIC READ CHANNEL

(75) Inventor: Robert Allen Hutchins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 11/014,475

(22) Filed: Dec. 15, 2004

(65) Prior Publication Data

US 2006/0126205 A1    Jun. 15, 2006

(51) Int. Cl.
*G11B 5/09* (2006.01)
(52) U.S. Cl. .......................................... 360/46
(58) Field of Classification Search ........................ None
See application file for complete search history.

(56) References Cited

U.S. PATENT DOCUMENTS

| | | | |
|---|---|---|---|
| 5,999,355 A | 12/1999 | Behrens et al. | 360/65 |
| 6,023,386 A | 2/2000 | Reed et al. | 360/51 |
| 6,078,462 A * | 6/2000 | Zuffada et al. | 360/77.08 |
| 6,111,710 A * | 8/2000 | Feyh et al. | 360/46 |
| 6,208,481 B1 | 3/2001 | Spurbeck et al. | 360/65 |
| 6,473,254 B1 | 10/2002 | Hamaguchi et al. | 360/48 |
| 6,867,941 B1 * | 3/2005 | Ozdemir | 360/66 |
| 6,882,486 B1 * | 4/2005 | Kupferman | 360/51 |
| 7,095,803 B2 * | 8/2006 | Gazsi et al. | 375/316 |
| 2001/0009483 A1 | 7/2001 | Satoh et al. | 360/65 |
| 2006/0119964 A1 * | 6/2006 | Eleftheriou et al. | 360/46 |

\* cited by examiner

*Primary Examiner*—William J. Klimowicz
*Assistant Examiner*—Dan I Davidson
(74) *Attorney, Agent, or Firm*—Kunzler & McKenzie

(57) ABSTRACT

An apparatus, system, and method are disclosed for controlling gain in a magnetic media read channel. In one embodiment, a sampling module provides an asynchronous digital stream corresponding to encoded signals on a streaming magnetic medium, a stream synchronization module converts the asynchronous digital stream to a synchronous digital stream, and a gain control module processes the asynchronous digital stream and provides a gain control signal concurrent to synchronization of the asynchronous digital stream. The described apparatus, method, and system enables calibration of a read channel using a calibration signal (such as a VFO waveform) of shorter duration than attainable with currently available calibration means and methods.

18 Claims, 5 Drawing Sheets

APPARATUS METHOD AND SYSTEM FOR CONCURRENT GAIN CONTROL IN A MAGNETIC READ CHANNEL

BACKGROUND OF THE INVENTION

1. Field of the Invention

This invention relates to methods, means, and systems for providing gain control within a media read channel.

2. Description of the Related Art

Magnetic media such as magnetic tape is typically encoded at regular intervals with a calibration region that facilitates synchronization and gain control within a read channel. One common method is to encode a sinusoidal waveform having a normalized frequency and amplitude with a Variable Frequency Oscillator (VFO). Regions on the media containing the normalized waveform are known as VFO regions.

FIG. 1 is a block diagram depicting selected portions of one embodiment of a currently available read channel 100. As depicted, the read channel 100 includes a sampling module 110, a VFO (region) detector 120, a stream synchronization module 130, a gain control module 140, a mixer 150, and a channel decoder 160. Multiple read channels 100 may be incorporated with a multi-track recording device such as a tape drive (i.e. one channel for each track).

The sampling module 110 samples the magnetic media in conjunction with a read head (not shown) or the like and provides an asynchronous digital stream to the VFO detector 120 and the stream synchronization module 130. The stream synchronization module 120 may normally operate in a tracking mode and include a phase-locked loop to track variations in the data rate of the digital stream. In response to the VFO detector detecting a calibration signal, the stream synchronization module may change to an acquisition mode in order to precisely calibrate (i.e. lock) the clock rate and signal gain of the read channel 100.

Subsequent to clock synchronization, the gain control module 140 may begin a gain normalization process by detecting the signal level of the synchronized (i.e. synchronous) digital stream. To achieve the required precision, a number of cycles of the VFO waveform may need to be processed.

After calibration, the read channel may resume processing in a tracking mode and provide an amplitude-normalized synchronous sample stream to the channel decoder 160. In certain systems, the channel decoder 160 is essentially a PRML estimator that processes a slightly oversampled synchronous sample stream. To be effective such an estimator requires that the sample stream be precisely normalized and tightly synchronized.

Applicant has observed that the precise and sequential nature of the calibration process in currently available high data rate read channels results in calibration regions that are quite lengthy. Furthermore, in multi-track systems, tape skew may further increase the required length of the VFO or similar calibration region resulting in large portions of the media being unavailable for data storage.

From the foregoing discussion, it should be apparent that a need exists for an apparatus, system, and method for gain control calibration that operates concurrently with clock synchronization. Beneficially, such an apparatus, system, and method would reduce the duration and media real estate necessary to precisely calibrate a read channel.

SUMMARY OF THE INVENTION

The present invention has been developed in response to the present state of the art, and in particular, in response to the problems and needs in the art that have not yet been fully solved by currently available data replication systems. Accordingly, the present invention has been developed to provide an apparatus, system, and method for controlling gain in a magnetic media read channel.

In one aspect of the present invention, an apparatus for controlling gain in a magnetic media read channel includes a sampling module that provides an asynchronous digital stream corresponding to encoded signals on a streaming magnetic medium, a stream synchronization module that converts the asynchronous digital stream to a synchronous digital stream, and a gain control module that receives the asynchronous digital stream and provides an gain control signal concurrent to synchronization of the asynchronous digital stream. The described apparatus enables calibration of the gain and sampling rate of a read channel using a calibration signal (such as a VFO waveform) of shorter duration than attainable with currently available calibration circuits.

The stream synchronization module may include a clock extraction module that receives the asynchronous digital stream, detects a calibration signal within the asynchronous digital stream and derives a clock signal from the calibration signal. The stream synchronization module may also include an interpolator configured to generate interpolated values that are substantially synchronous to the clock signal.

The sampling module may include an upsampler that increases the data rate of the asynchronous digital stream and provides additional precision to the calibration process. In one embodiment, the gain control module includes a peak extractor that extracts negative and positive peaks within the asynchronous digital stream. The gain control module may also include a normalizer that multiplies the extracted peaks by the output gain. The gain control module may also include a magnitude comparator that compares the value of normalized, extracted peaks with a reference value in order to provide a gain error signal. The gain control module may also include a filter that filters the gain error signal to provide the gain control signal.

The gain control signal and the synchronous digital stream may be processed by a mixer such as a digital multiplier in order to provide a normalized synchronous digital stream to a channel decoder. In one embodiment, the channel decoder is a partial response maximum likelihood (PRML) estimator.

In another aspect of the present invention, a method for controlling gain in a magnetic media read channel includes providing an asynchronous digital stream corresponding to encoded signals on a streaming magnetic medium, converting the asynchronous digital stream to a synchronous digital stream, and deriving a gain control signal from the asynchronous digital stream concurrent to converting the asynchronous digital stream to a synchronous digital stream. In one embodiment, converting the asynchronous digital stream to a synchronous digital stream includes extracting a clock signal, and capturing interpolated values that are substantially synchronous with the clock signal.

The asynchronous digital stream may be upsampled to increase the data rate of the asynchronous digital stream and the precision of the calibration process. In certain embodiments, deriving the gain control signal involves extracting negative and positive peaks within the asynchronous digital stream and multiplying the extracted peaks by the output gain to normalize the peaks. Deriving the gain control signal may also include comparing a normalized peak value with a reference value and filtering the difference to provide the gain control signal.

In another aspect of the present invention, a system for controlling gain in a magnetic media read channel includes a magnetic media such as a streaming magnetic tape, means for moving the magnetic media, and a read channel that includes the aforementioned sampling module, stream synchronization module, and gain control module. The stream synchronization module may operate concurrently on the asynchronous digital stream provided by the sampling module resulting in a lower latency calibration process for a read channel.

The present invention provides certain advantages over the prior art. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the sane embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
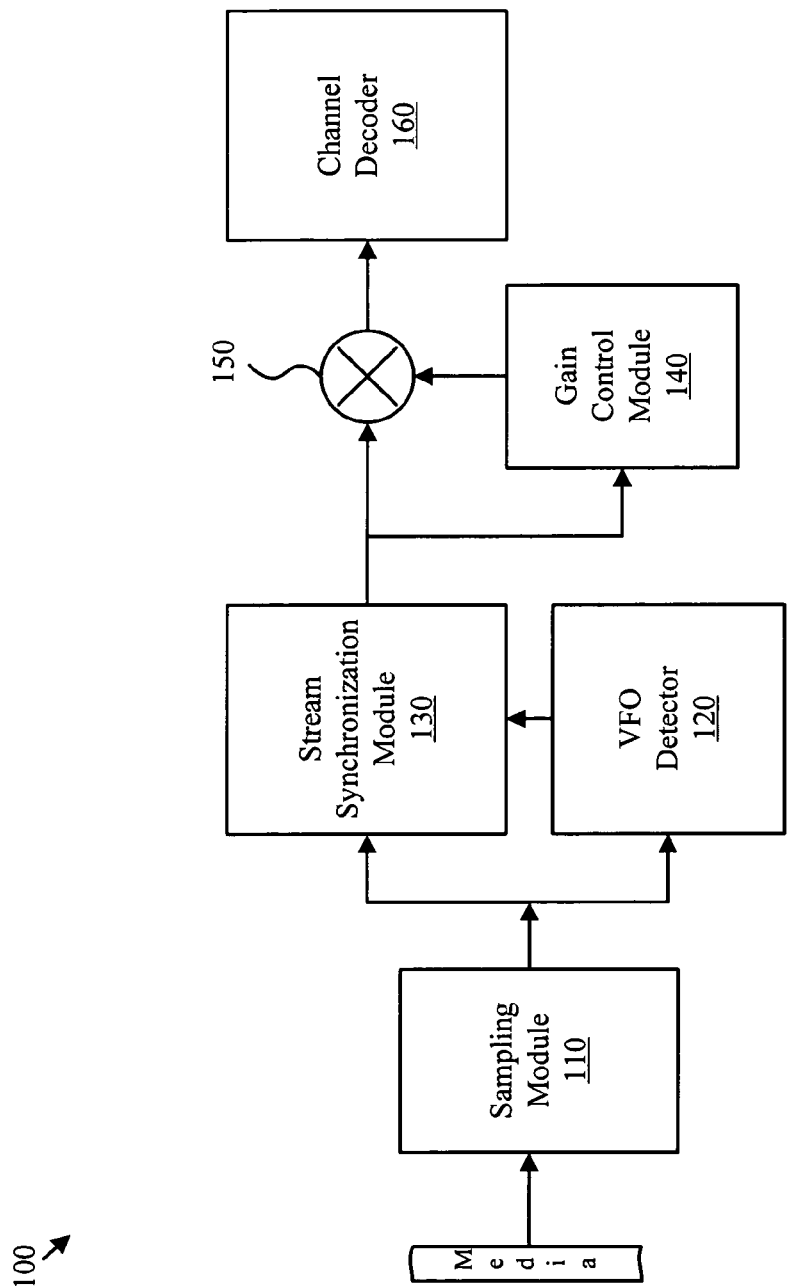
FIG. 1 is a block diagram depicting selected portions of one embodiment of a prior art read channel.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single dataset, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
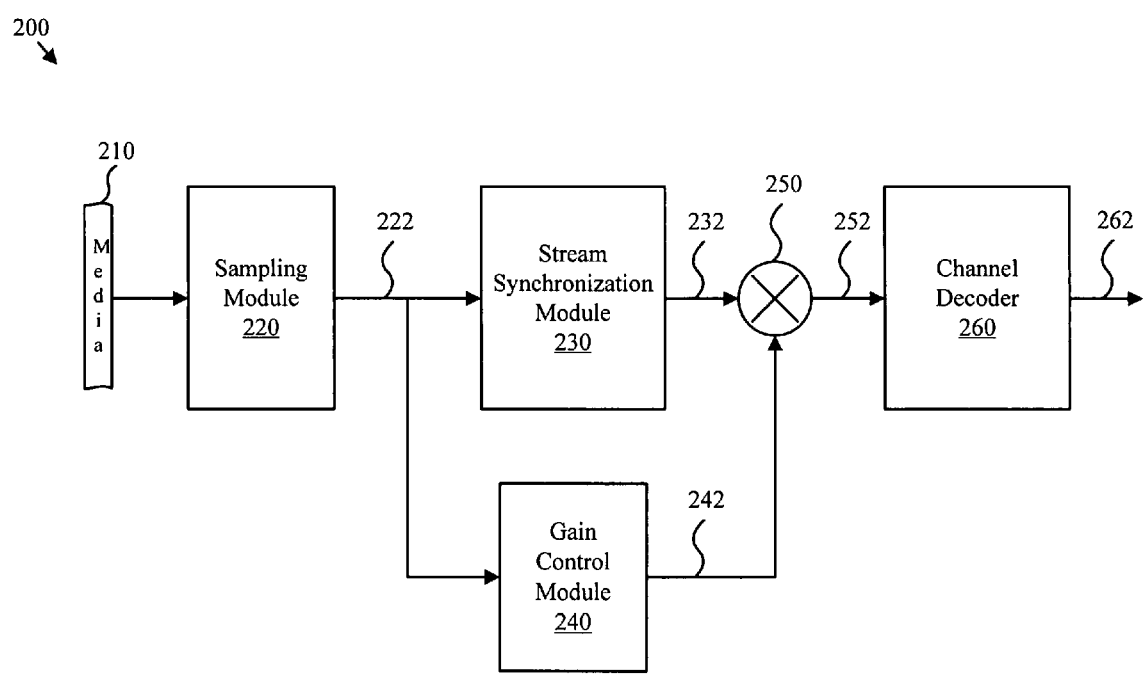
FIG. 2 is a block diagram depicting one embodiment of a read channel calibration system of the present invention.

FIG. 2 is a block diagram depicting one embodiment of a read channel calibration system 200 of the present invention. As depicted, the read channel calibration system 200 includes a magnetic media 210, a sampling module 220, a stream synchronization module 230, a gain control module 240, a mixer 250, and a channel decoder 260. The read channel calibration system 200 enables concurrent acquisition of gain and synchronization parameters from a calibration region on the magnetic media 210.

The magnetic media 210 retains data and control information encoded thereon. The magnetic media 210 may have magnetized regions corresponding to symbols (such as bits or bytes) that are sequentially written to or read from the media as tracks. In certain embodiments, multiple tracks are read or written in parallel by placing a multi-element head (not shown) in close proximity to the magnetic media and passing the magnetic media past the head. In one embodiment, the magnetic media 210 is a magnetic tape encoded with a (0, k) encoding algorithm.

To read data, the sampling module 220 samples a signal generated by the magnetic media and provides an asynchronous digital stream 222 that is correlated with the encoding on the magnetic media. To increase data throughput and reliability, the sampling module 220 may sample at rate that is slightly higher than the rate at which the data was written to the magnetic media. In one embodiment, the read sample rate is 25 percent higher than the write sample rate.

The media may be contained within a variable speed device that adjusts the sampling rate in proportion to the velocity of the media. In certain embodiments, the sampling module 220 includes an upsampler (not shown) which further increases the data rate of the asynchronous digital stream 222. In one embodiment, the upsampler doubles the sample rate by estimating intermediate samples using a mid-linear filter.

The samples provided by the sampling module may not be synchronous to the sampling clock and may not correspond to the maximum signal level generated by each symbol on the media. The stream synchronization module 230 receives the asynchronous stream of samples 222 corresponding to a calibration signal such as a VFO waveform, extracts a clock signal therefrom, and provides a synchronous stream of samples 232 that are synchronous to the extracted clock signal. In one embodiment, the synchronous samples are provided by capturing interpolated values generated from the asynchronous samples.

The gain control module 240 measures the level of the calibration signal and provides a gain control signal 242 used to normalize the values sampled from the magnetic media. In contrast to prior art solutions, the gain control module 240 derives the gain control signal 242 from the asynchronous samples and may operate concurrently with the synchronization module 230. Concurrent operation reduces calibration time and enables the use of shorter calibration regions on the magnetic media. In one embodiment, the gain control module 240 detects the signal level of the calibration signal by extracting peak values from the asynchronous samples.

The mixer 250 normalizes the amplitude of the synchronous stream 232 to provide a normalized synchronous digital stream 252. In the depicted embodiment, the mixer 250 is a digital multiplier. The channel decoder 260 decodes the synchronous stream 252 and provides a decoded stream 262. In one embodiment, the channel decoder 260 is a partial response maximum likelihood (PRML) estimator that uses the redundancy of the oversampled stream to estimate the data that was written to the magnetic media.

As describe above, the functional units of the read channel calibration system 200 function together to concurrently calibrate or 'lock' the gain and clock rate of a read channel. Concurrent calibration enables the use of shorter calibration regions on the magnetic media thereby increasing the information storage capacity of the media.

Figure 3:
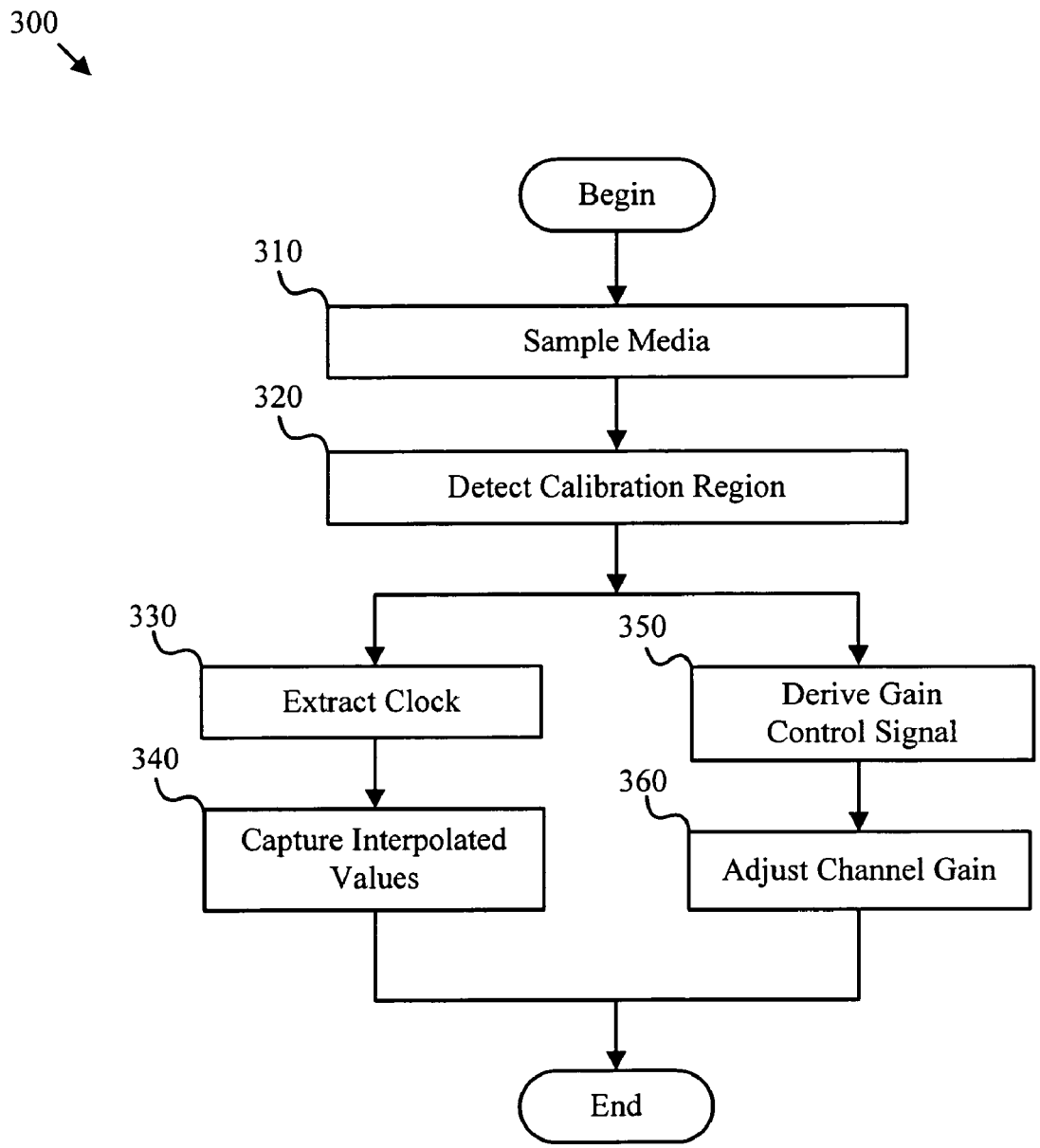
FIG. 3 is a flow chart diagram depicting one embodiment of a read channel calibration method of the present invention.

FIG. 3 is a flow chart diagram depicting one embodiment of a read channel calibration method 300 of the present invention. As depicted, the read channel calibration method 300 includes sampling 310 a magnetic media, detecting 320 a calibration region, extracting 330 a clock signal, capturing 340 interpolated values, deriving 350 a gain control signal, and adjusting 360 the channel gain. The read channel calibration method 300 enables concurrent acquisition of gain and synchronization parameters and may be conducted in conjunction with the read channel calibration system 200 depicted in FIG. 2.

Sampling 310 a magnetic media may occur asynchronously resulting in an asynchronous digital stream such as the asynchronous stream 222. Detecting 320 a calibration region enables a read channel to transition from a tracking mode to a calibration mode. Extracting 330 a clock signal and capturing 340 interpolated values facilitates conversion of the asynchronous digital stream to a synchronous digital stream such as the synchronous stream 232.

Deriving 350 a gain control signal derives a gain control signal from the asynchronous digital stream. Subsequently, the gain control signal is used in adjusting 360 the channel gain. Adjusting 360 the channel gain normalizes the synchronous digital stream and reduces the error rate of a channel decoding process such as PRML estimation. As illustrated, extracting 330 a clock signal and capturing 340 interpolated values may occur concurrently with deriving 350 a gain control signal and adjusting 360 the channel gain thus reducing the time required to lock or calibrate a read channel.

Figure 4:
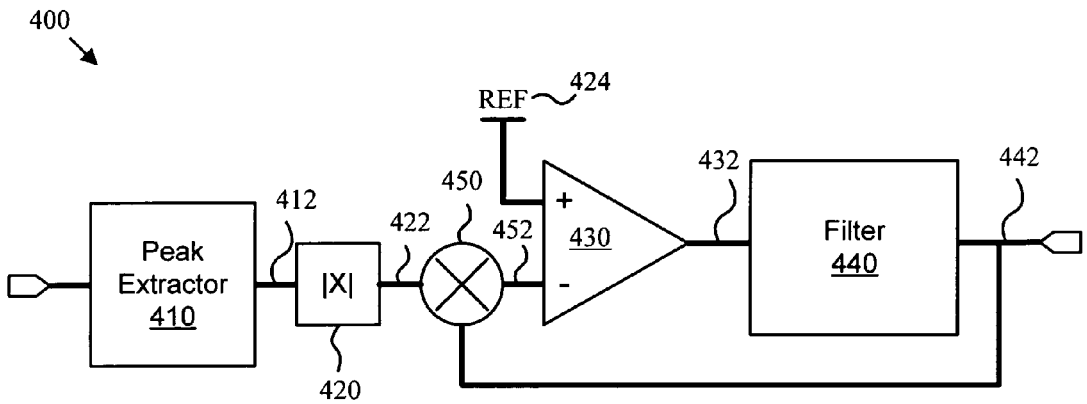
FIG. 4 is a schematic block diagram depicting one embodiment of a gain control module of the present invention.

FIG. 4 is a schematic block diagram depicting one embodiment of a gain control module 400 of the present invention. As depicted, the gain control module 400 includes a peak extractor 410, a rectifier 420, a comparator 430, a filter 440, and a multiplier 450. The gain control module 440 receives an asynchronous digital stream derived from a magnetic media such as a magnetic tape, and provides a gain control signal useful for decoding data within a read channel. The gain control module 400 is one example of the gain control module 240 depicted in FIG. 1.

The peak extractor 410 extracts peaks from a digital stream to provide extracted peaks 412. In the depicted embodiment, both negative and positive peaks are extracted. Using both negative and positive peaks increases the accuracy of a calibration process and substantially reduces the effects of any DC offset or drift. The rectifier 420 converts extracted peaks 412 with negative values to positive values to provide rectified peaks 422.

In one embodiment, the rectifier peaks 422 are multiplied by multiplier 450 with the gain output 442 to create a normalized, rectified output 452. In the depicted embodiment, the comparator 430 compares the normalized, rectified peaks 452 with a reference value 424 and provides an error signal 432. In one embodiment, the comparator 430 is a digital subtraction circuit. The filter 440 filters the error signal 432 to reduce noise and minimize the difference between the normalized, rectified peaks 452 and the reference value 424. In one embodiment, the filter 440 provides the gain control signal 442.

Figure 5:
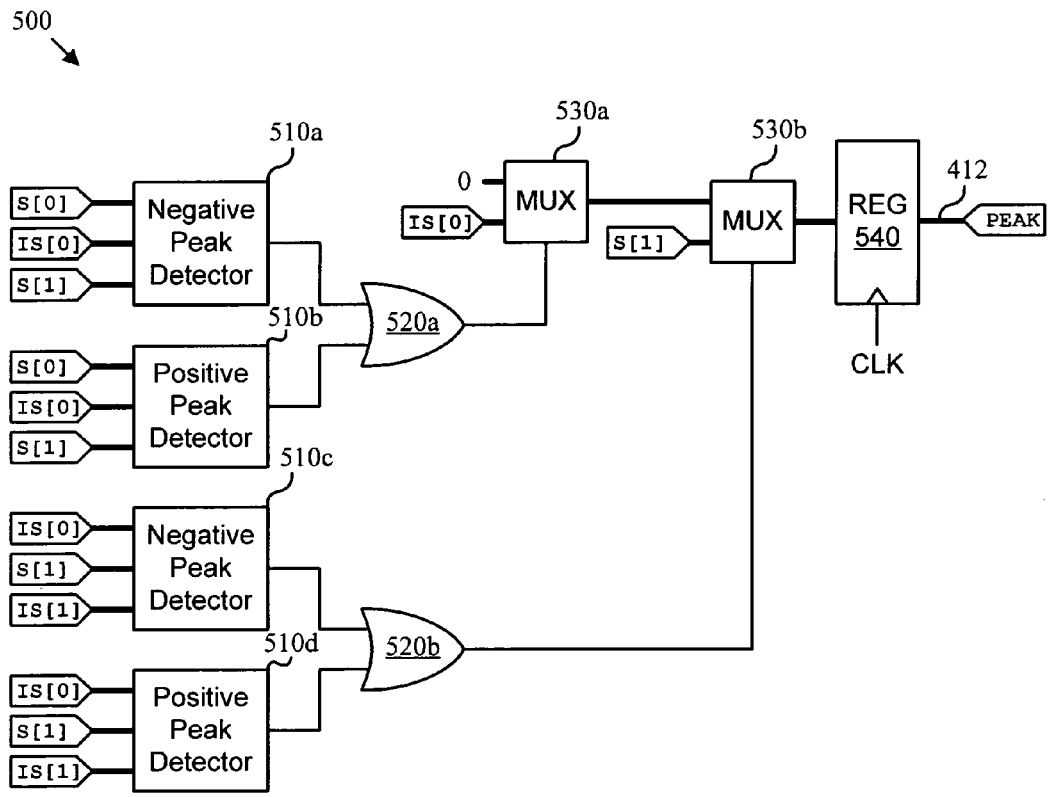
FIG. 5 is a schematic block diagram depicting one embodiment of a peak extraction module of the present invention.

FIG. 5 is a schematic block diagram depicting one embodiment of a peak extraction module 500 of the present invention. As depicted, the peak extraction module 500 includes a set of peak detectors 510, logic gates 520, multiplexors 530, and an output register 540. The peak extraction module 500 facilitates extraction of peaks within an upsampled digital stream and is one example of the peak extractor 400 depicted in FIG. 4.

The peak detectors 510 detect peaks within a digital stream. In the depicted arrangement, the peak detectors 510a and 510c are negative peak detectors while the peak detectors 510b and 510d are positive peak detectors. The peak detectors 510 may receive adjacent samples (e.g. S[0] and S[1]) from a digital stream that are interleaved with adjacent interpolated samples (e.g. IS[0] and IS[1]). In one embodiment, the interpolated samples are midpoint estimates for the digital stream corresponding to a delay of half the period of the sampling clock. Using an upsampled digital stream with interpolated samples improves the accuracy of the calibration process.

The peak detectors receive 3 or more adjacent values from the (interleaved) digital stream. In one embodiment, the positive peak detectors 510 assert their output if the second value is greater than the first value and the second value is also greater than or equal to the third value. In the depicted arrangement, the asserted outputs are used to select either an original sample (e.g. S[1]) or an interpolated sample (e.g. IS[0]) via the multiplexors 530. The selected sample is stored in the register 540 as an extracted peak 412.

Figure 6:
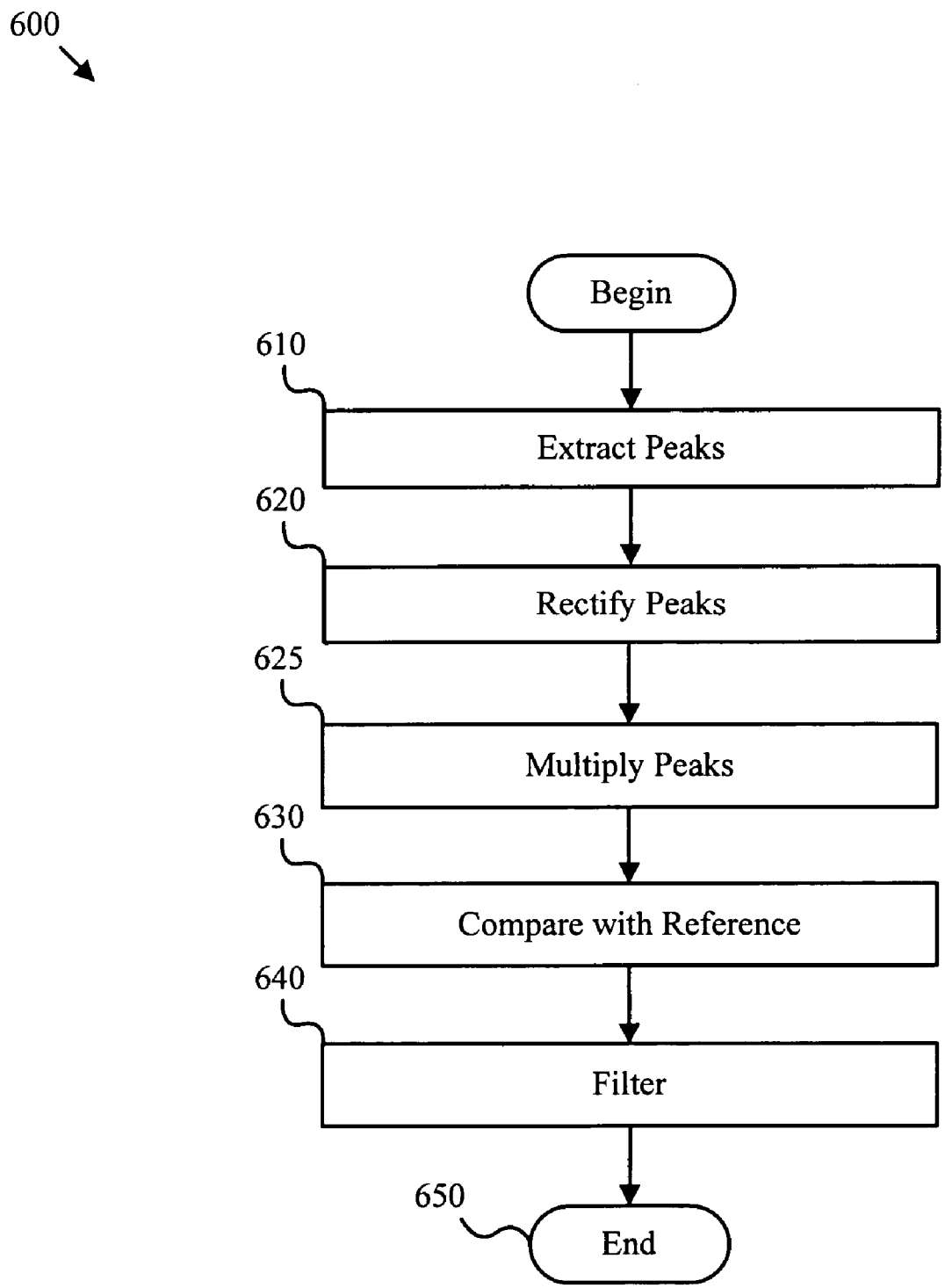
FIG. 6 is a flow chart diagram depicting one embodiment of a gain control method of the present invention.

FIG. 6 is a flow chart diagram depicting one embodiment of a gain control method 600 of the present invention. As depicted, the gain control method 600 includes extracting 610 peaks from a digital stream, rectifying 620 the peaks, normalizing 625, comparing 630 with a reference, and filtering 640. The gain control method 600 may be conducted in conjunction with the gain control module 400 depicted in FIG. 4 and the gain control module 240 depicted in FIG. 2.

Extracting 610 peaks from a digital stream may include extracting sample values for both negative and positive peaks to provide a sequence of sample values corresponding to the amplitude of the digital stream. Rectifying 620 the peaks, rectifies negative peaks to provide a positive value for all peaks. Normalizing 625 the peaks, adjusts the peak amplitude according to the output gain. Comparing 630 with a reference may involve conducting a subtraction algorithm that provides an error value. Filtering 640 filters successive error values to provide a gain control signal, or the like, that can be used to normalize the amplitude of the digital stream.

The present invention facilitates acquisition of gain control parameters concurrently with synchronization of an asynchronous stream of samples read from a magnetic media. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling gain in a magnetic media read channel, the apparatus comprising:
   a sampling module configured to provide an asynchronous digital stream corresponding to encoded signals on a streaming magnetic medium;
   a stream synchronization module configured to convert the asynchronous digital stream to a synchronous digital stream; and
   a gain control module configured to receive the asynchronous digital stream, extract negative and positive peaks within the asynchronous digital stream to provide extracted peaks, and process the extracted peaks to provide an gain control signal concurrent to synchronization of the asynchronous digital stream.

2. The apparatus of claim 1, wherein the gain control module is further configured to normalize the extracted peaks.

3. The apparatus of claim 1, wherein the gain control module further comprises a magnitude comparator configured to compare a peak value with a reference value and thereby provide a gain error signal.

4. The apparatus of claim 3, wherein the gain control module further comprises a filter configured to filter the gain error signal and thereby provide the gain control signal.

5. The apparatus of claim 1, further comprising a channel decoder configured to decode an original data stream from the synchronous digital stream.

6. The apparatus of claim 5, wherein the channel decoder is a partial response maximum likelihood (PRML) estimator.

7. The apparatus of claim 1, wherein the sampling module comprises an upsampler configured to increase the data rate of the asynchronous digital stream.

8. The apparatus of claim 1, wherein the stream synchronization module comprises a clock extraction module configured to receive the asynchronous digital stream and provide a clock signal.

9. The apparatus of claim 8, wherein the stream synchronization module further comprises an interpolator configured to generate an interpolated value that is substantially synchronous to the clock signal.

10. The apparatus of claim 1, wherein the stream synchronization module is further configured to detect a calibration signal within the asynchronous digital stream.

11. A method for controlling gain in a magnetic media read channel, the method comprising:
    providing an asynchronous digital stream corresponding to encoded signals on a streaming magnetic medium;
    converting the asynchronous digital stream to a synchronous digital stream; and
    extracting negative and positive peaks within the asynchronous digital stream to provide extracted peaks, and processing the extracted peaks to derive a gain control signal from the asynchronous digital stream concurrent to converting the asynchronous digital stream to a synchronous digital stream.

12. The method of claim 11, wherein deriving the gain control signal further comprises normalizing the extracted peaks.

13. The method of claim 11, wherein deriving the gain control signal further comprises comparing a peak value with a reference value to provide a gain error signal.

14. The method of claim 13, wherein deriving the gain control signal further comprises filtering the gain error signal to provide the gain control signal.

15. The method of claim 11, further comprising decoding an original data stream from the synchronous digital stream using partial response maximum likelihood (PRML) estimation.

16. The method of claim 11, further comprising upsampling to increase the data rate of the asynchronous digital stream.

17. The method of claim 11, wherein converting the asynchronous digital stream to a synchronous digital stream comprises extracting a clock signal from the asynchronous digital stream.

18. A system for controlling gain in a magnetic media read channel, the system comprising:
    a magnetic media;
    means for moving the magnetic media;
    a read channel comprising:
        a sampling module configured to provide an asynchronous digital stream corresponding to encoded signals on a streaming magnetic medium,
        a stream synchronization module configured to convert the asynchronous digital stream to a synchronous digital stream, and
        a gain control module configured to receive the asynchronous digital stream, extract negative and positive peaks within the asynchronous digital stream to provide extracted peaks, and process the extracted peaks to provide an gain control signal concurrent to synchronization of the asynchronous digital stream.

* * * * *